(12) United States Patent
David (10) Patent No.: US 9,536,254 B1
(45) Date of Patent: Jan. 3, 2017

(54) SYSTEM AND METHOD FOR PROVIDING A VEHICLE CONDITION REPORT

(71) Applicant: Condition Report LLC, St. Louis, MO (US)

(72) Inventor: Alex E. David, St. Louis, MO (US)

(73) Assignee: Condition Report LLC, St. Louis, MO (US)

( * ) Notice: Subject to any disclaimer, the term of this patent is extended or adjusted under 35 U.S.C. 154(b) by 638 days.

(21) Appl. No.: 13/916,746

(22) Filed: Jun. 13, 2013

Related U.S. Application Data (60) Provisional application No. 61/659,064, filed on Jun. 13, 2012.

(51) Int. Cl.
| | |
|---|---|
| *G07C 5/00* | (2006.01) |
| *G06Q 30/02* | (2012.01) |
| *H04N 7/18* | (2006.01) |
| *B60R 1/00* | (2006.01) |

(52) U.S. Cl.
CPC .......... *G06Q 30/0278* (2013.01); *H04N 7/183* (2013.01); *B60R 1/00* (2013.01); *B60R 2300/105* (2013.01); *G07C 5/008* (2013.01); *H04N 7/181* (2013.01)

(58) Field of Classification Search
CPC ....... G06Q 30/0278; G07C 5/008; B60R 1/00; B60R 2300/105; B60R 2300/802; B60R 11/04; H04N 7/181
USPC .......................................................... 348/148
See application file for complete search history.

(56) References Cited

U.S. PATENT DOCUMENTS

| | | | | |
|---|---|---|---|---|
| 2003/0172016 | A1* | 9/2003 | Chandran | G06Q 30/0201 705/35 |
| 2006/0114531 | A1* | 6/2006 | Webb | G01N 21/8806 359/15 |
| 2007/0136162 | A1* | 6/2007 | Thibodeau | G06Q 20/12 705/35 |
| 2008/0255887 | A1* | 10/2008 | Gruter | G06Q 40/08 705/4 |
| 2009/0138290 | A1* | 5/2009 | Holden | G06Q 10/087 705/4 |
| 2012/0246036 | A1* | 9/2012 | Marr | G06Q 30/08 705/27.1 |
| 2012/0297337 | A1* | 11/2012 | St. Denis | G06Q 10/06313 715/810 |

* cited by examiner

*Primary Examiner* — Tat Chio
*Assistant Examiner* — On S Mung
(74) *Attorney, Agent, or Firm* — Eric L. Sophir; Dentons US LLP (57) ABSTRACT

A system and method for providing a current, standardized and comprehensive vehicle condition report while also creating lead generation data. Embodiments described herein can process vehicle information, vehicle appraisal, and computerized arrangements that enable shoppers to investigate, locate, specify, requisition, purchase, or otherwise exchange information concerning vehicles.

29 Claims, 5 Drawing Sheets

SYSTEM AND METHOD FOR PROVIDING A VEHICLE CONDITION REPORT

CROSS-REFERENCE TO RELATED APPLICATIONS

This application claims priority to U.S. Provisional Patent Application Ser. No. 61/659,064, filed Jun. 13, 2012, entitled "System and Method for Providing a Vehicle Condition Report," which is hereby incorporated by reference in its entirety.

FIELD OF THE INVENTION

The present invention relates generally to processing of vehicle information.

BACKGROUND

Online shopping has revolutionized the way people purchase everything from shoes to stereos. But the larger the purchase, the more anxious a consumer becomes for some guarantee that the product will be worth the asking price. Accordingly, for the modern consumer, purchasing a vehicle can be a complicated task. Many prospective buyers use the internet to identify vehicles that may be located hundreds of miles away, making vehicle inspection a difficult undertaking Even before a suitable vehicle is located, a consumer undergoes a decision-making process that includes several steps.

A consumer must first decide what kind of vehicle best meets his or her needs. Criteria may include size, make, model, aesthetics, price, and a host of additional features. Vehicles meeting the desired characteristics may be located anywhere in the world and, unlike buyers from years past, today's consumers benefit from the internet's wide reach as a tool to help locate cost-effective options or vehicles that are rare (e.g., limited production or antique). Conventionally, vehicle searches can be performed through services such as AutoTrader.com, Cars.com, or eBay. These services allow users to locate new or used vehicles and may also provide information such as vehicle history, vehicle options, and a description of the vehicle's overall condition.

Once a suitable vehicle has been located, a consumer may next wish to determine whether the vehicle's history justifies a listed purchase price. Such a determination could involve an inspection of insurance records or it might require research into accident reports or state title and registration documents. In the past, such information was difficult to reliably locate. However, in recent years, services such as CarFax, AutoCheck, and Kelly Blue Book have made vehicle accident reports and historical information easier to obtain. Such services allow buyers and sellers to transact business with some information about a vehicle's reported history and subjective value. But offsite vehicle consumers are still without a way to determine a vehicle's current mechanical and aesthetic condition in a standardized and reliable format.

One conventional system attempts to generate leads by determining an offer price for a vehicle using historical data, such as wholesale sales that occur at vehicle auctions and dealerships, and dealer selected buyer criteria. However, this system does not provide access to current data regarding a vehicle's actual mechanical and aesthetic condition in a standardized format.

Similarly, another conventional system attempts to allow a consumer to search a database containing used vehicles for a variety of sellers that can be queried to provide search results that include vehicles having only clean title histories. Yet, as above, the database includes only vehicle histories and does not provide current standardized vehicle condition reports.

As yet another example, a conventional system generates an automated vehicle specific valuation of a used car based on the physical and historical attributes of that vehicle. However, the system's scoring method does not account for the actual current condition of a vehicle. Accordingly, users of such a system are not able to make completely informed vehicle purchase decisions.

There is currently no system that provides purchasers with access to reliable, detailed, standardized information related to the current mechanical and aesthetic condition of a vehicle. Also, there is currently no system that provides a uniform interface through which users may objectively compare the current mechanical and aesthetic condition of multiple vehicles. Accordingly, there exists a need for a system that offers real-time access to standardized information about a vehicle's current mechanical and cosmetic condition.

In addition, after a desired vehicle's mechanical and aesthetic condition has been confirmed, a purchaser may need to arrange financing, insurance and/or vehicle shipping. Buyers who purchase a vehicle that is located far away and who wish to take delivery in person may need to make flight or other travel arrangements. Providers of these purchase-related services have a need for reliable lead-generation information so that they can efficiently focus their marketing efforts on those who are most likely to appreciate them.

SUMMARY

The embodiments described herein attempt to overcome the deficiencies of the conventional systems creating and using standardized current vehicle condition reports generated from inspection data collected by authorized service providers. In one embodiment, a system can include at least one database connected to at least one server in communication with at least: (1) one or more vehicle sellers, such as individuals or dealers, who may have listings advertising any number of vehicles; (2) one or more system users such as prospective vehicle buyers who may access the system to obtain information about the current condition of any number of vehicles; (3) one or more vehicle inspection providers; and (4) one or more lead generation partners including insurance, vehicle transportation and load finance providers. In some embodiments, a vehicle seller and a vehicle inspection provider may be the same party. Other aspects of the system may include at least one database connected to at least one server configured to receive and compile vehicle documentation and history information.

In one embodiment, a method for generating a vehicle condition report comprises receiving, by a server, a request to generate a vehicle condition report for a vehicle from a first user using a first user terminal over a communication network; transmitting, by the server, a notification to a computer terminal associated with a vehicle inspector notifying the vehicle inspector that a request by the first user has been made to have the vehicle inspected; receiving, by the server, vehicle inspection data from the computer terminal associated with the vehicle inspector after the vehicle inspector has inspected the vehicle, wherein the vehicle inspection data includes information describing a current mechanical and aesthetic condition of the vehicle; and compiling, by the server, the vehicle inspection data with vehicle identification data to produce the vehicle condition report for the vehicle.

In another embodiment, a system for generating a condition report comprises: a server configured to: receive a request to generate a vehicle condition report for a vehicle from a first user using a first user terminal over a communication network; transmit a notification to a computer terminal associated with a vehicle inspector notifying the vehicle inspector that a request by the first user has been made to have the vehicle inspected; receive vehicle inspection data from the computer terminal associated with the vehicle inspector after the vehicle inspector has inspected the vehicle, wherein the vehicle inspection data includes information describing a current mechanical and aesthetic condition of the vehicle; compile the vehicle inspection data with vehicle identification data to produce a vehicle condition report for the vehicle; and transmit the vehicle condition report to a user terminal requesting the vehicle condition report; and a database configured to store the vehicle condition report for the vehicle.

In yet another embodiment, a method for generating a vehicle condition report comprises: receiving, by a server, a request to generate a vehicle condition report for a vehicle from a first user using a first user terminal over a communication network; transmitting, by the server, a notification to a computer terminal associated with a vehicle inspector notifying the vehicle inspector that a request by the first user has been made to have the vehicle inspected; receiving, by the server, vehicle inspection data from the computer terminal associated with the vehicle inspector after the vehicle inspector has inspected the vehicle, wherein the vehicle inspection data includes quantitative mechanical data and aesthetic condition data describing a current mechanical and aesthetic condition of the vehicle; analyzing, by the server, the quantitative mechanical data included in the vehicle inspection data to generate a mechanical score for the vehicle; analyzing, by the server, the aesthetic condition data included in the vehicle inspection data to generate an aesthetic score for the vehicle; combining, by the server, the mechanical score and the aesthetic score to generate a rating for the vehicle; and compiling, by the server, the vehicle inspection data with vehicle identification data and the rating to produce a vehicle condition report for the vehicle.

In another embodiment, a system for generating a condition report comprises: a server configured to: receive a request to generate a vehicle condition report for a vehicle from a first user using a first user terminal over a communication network; transmit a notification to a computer terminal associated with a vehicle inspector notifying the vehicle inspector that a request by the first user has been made to have the vehicle inspected; receive vehicle inspection data from the computer terminal associated with the vehicle inspector after the vehicle inspector has inspected the vehicle, wherein the vehicle inspection data includes quantitative mechanical data and aesthetic condition data describing a current mechanical and aesthetic condition of the vehicle; analyze the quantitative mechanical data included in the vehicle inspection data to generate a mechanical score for the vehicle; analyze the aesthetic condition data included in the vehicle inspection data to generate an aesthetic score for the vehicle; combine the mechanical score and the aesthetic score to generate a rating for the vehicle; and compile the vehicle inspection data with vehicle identification data and the rating to produce a vehicle condition report for the vehicle; and a database configured to store the vehicle condition report for the vehicle.

In another embodiment, a handheld device comprises: a camera configured to record images; a memory unit configured to store information inputted by a user, information received from the camera, information generated by the handheld device, and a software application, wherein the software application is configured to: receive a vehicle identification number ("VIN"); load an inspection protocol based on the vehicle's VIN; and generate step-by-step instructions that guide the user through the inspection protocol, wherein the step-by-step instruction include displaying pre-populated vehicle profile data based on the VIN, calling the camera so that the user may use the camera to record an image of designated areas of the vehicle, and generate a form where the user can input data about the vehicle; a network interface configured to connect the handheld device to a network and communicate with other computing devices; an input/output device configured to receive information input by the user and display information to the user; and a processor configured to execute the software application, process image information from the camera; and process all information inputted during the inspection protocol to generate vehicle inspection data to be sent through the network interface to a server.

In another embodiment, a method for generating a vehicle condition report comprises: receiving, by a server, a request to generate the vehicle condition report for a vehicle from a prospective buyer using a first computer terminal over a communication network; transmitting, by a server, a notification to a vehicle owner using a second computer terminal notifying the vehicle owner that the prospective buyer requested a vehicle condition report for the vehicle; receiving, by a server, a selection of a vehicle inspector from the vehicle owner using the second computer terminal where the vehicle is to be inspected; transmitting, by the server, a notification to the vehicle inspector using a third computer terminal notifying the vehicle inspector that a request has been made to have the vehicle inspected; receiving, by the server, vehicle inspection data from the third computer terminal after the vehicle inspector has inspected the vehicle, wherein the vehicle inspection data includes information describing a current mechanical and aesthetic condition of the vehicle; and compiling, by the server, the vehicle inspection data with vehicle identification data to produce a condition report for the vehicle.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments will be understood more fully in view of the accompanying drawings which should not be taken to limit the invention to a specific embodiment but are for explanation and understanding only.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
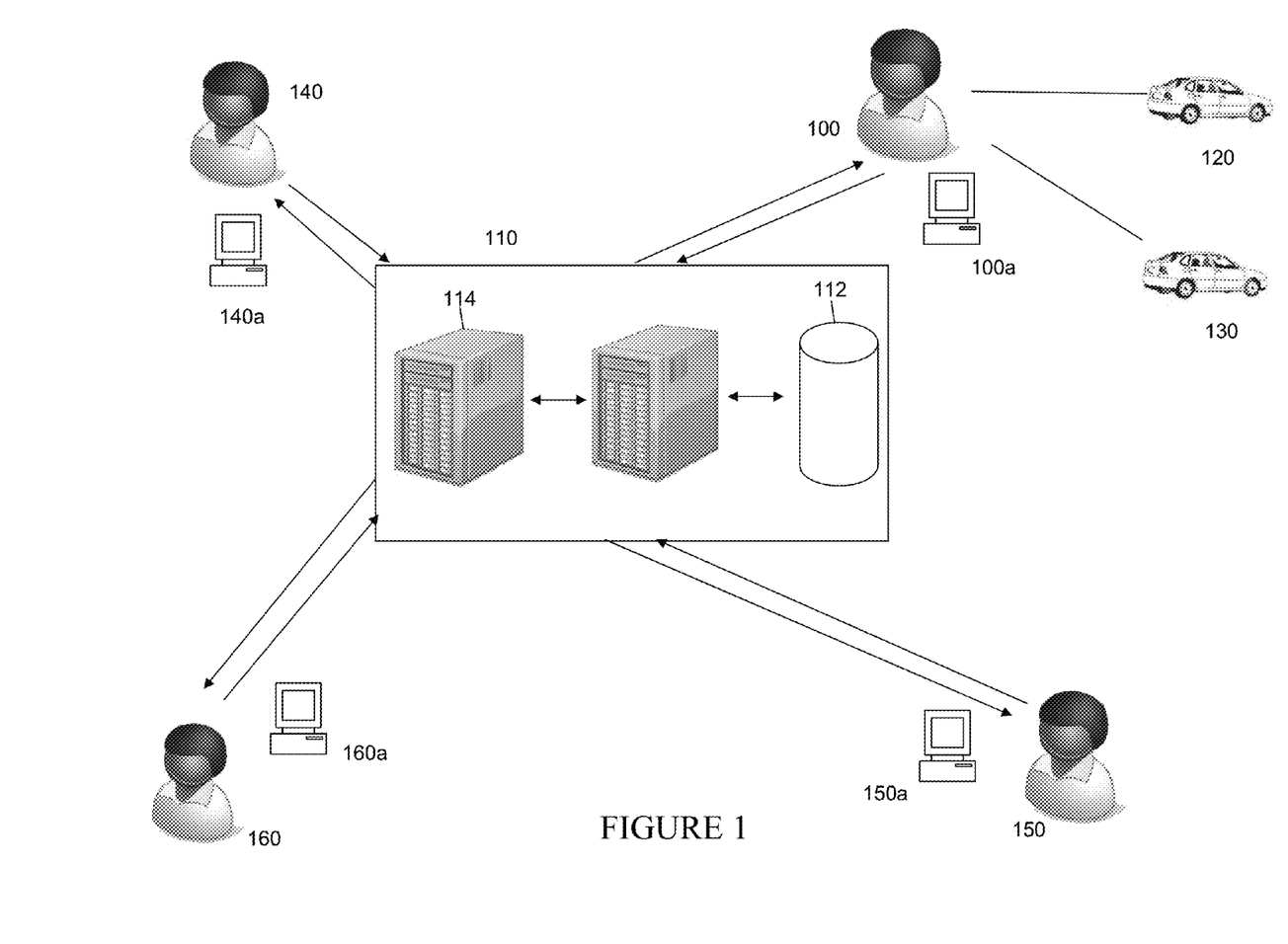
FIG. 1 is a schematic system diagram according to an exemplary embodiment.

When a seller wants to sell a vehicle, the seller may request a condition report for the vehicle so that interested and prospective buyers can request a copy of the condition report in conducting their due diligence on the condition of the vehicle. The seller may choose to obtain the condition report at the time of placing an advertisement, when valuing a vehicle, or upon request from a buyer. As shown in FIG. 1, a user, such as a vehicle owner or seller 100, may transmit a request to a data storage system 110 for a condition report related to one or more vehicles 120, 130. The vehicle 120, 130 may be an automobile, boat, motorcycle, RV, truck, service vehicle, construction machinery, or any other type of vehicle or equipment. The vehicle owner or seller 140 may include a person or a plurality of people. A vehicle owner or seller 100 may also include a dealer or a network of dealers. Other embodiments include seller-subscribers who access the system under an incentive program or access-membership format. Vehicle sellers 100 may include any combination of the above and may be located anywhere in the world. The data storage system 110 may include a database 112, a server 114, or a combination of any number of databases and servers in one or more locations. The request for a condition report may be transmitted from a seller's 100 computer or mobile device 100a, such as a telephone, smartphone, tablet computer, personal data assistant, handheld computer, personal computer, laptop computer, or other computing device. The transmission is received by the data storage system 110, which in turn transmits a notification to a computer or mobile device 140a, such as a telephone, smartphone, tablet computer, personal data assistant, handheld computer, personal computer, laptop computer, vehicle diagnostic handset, or other computing device, of one or more vehicle inspection personnel 140.

Upon receiving a request or an order for a condition report, vehicle inspection personnel 140 use the computer or mobile device 140a to perform a prescribed inspection of the one or more vehicles 120, 130 associated with the requested condition report and transmit vehicle inspection data that describes the current mechanical and aesthetic condition of the one or more vehicles 120, 130 to the data storage system 110. The vehicle inspection data may be accompanied by photographs or videos of the one or more vehicles. The inspection data may be transmitted from the computer or mobile device 140a to the data storage system 110. The data may be transmitted from the same device that received the order, or it may be transmitted by a different device such as a telephone, smartphone, tablet computer, personal data assistant, handheld computer, personal computer, laptop computer, or other computing device. The inspection data may be in the form of current vehicle mechanical condition, condition of the vehicle's body or interior, vehicle photos, and/or a vehicle rating. The computer or mobile device 140a may also collect and transmit information about aftermarket modifications or other vehicle details to the data storage system 110. All vehicle inspection personnel 140 can be prompted to collect vehicle inspection data in a substantially standardized way so that data related to a first vehicle 120 can be compared to data of one or more additional vehicles 130. In other embodiments, a vehicle owner or seller 100 may collect vehicle photographs or video which may be uploaded, by the vehicle seller 100, to the system database 112 through proprietary software such as a mobile device or computer software application. The proprietary software may also include one or more software applications that instruct the seller 100 or vehicle inspection personnel 140 how to take vehicle photographs. The photographs can be uploaded by the seller 100, vehicle inspection personnel 140, or another entity. In one embodiment, the inspection may require certain photographs, including but not limited to, a photograph of the interior, each wheel, a fender view, a bumper view, a side view, a top view, a front view, a back view, a dashboard view, and an odometer view.

The data storage system 110 receives vehicle inspection data from the vehicle inspection personnel 140, stores the vehicle inspection data, and compiles it along with vehicle identification data (i.e., VIN, make, model, etc) and vehicle history data (i.e., accident reports, Carfax, Kelley Blue Book data) to produce a comprehensive vehicle condition report that includes all such information. The data storage system 110 is configured to transmit compiled condition reports when it receives a request from a user such as a prospective vehicle purchaser 150 or a vehicle owner or vehicle seller 100 or anyone who wishes to review a vehicle condition report.

The condition report may include an alphanumeric rating corresponding to the condition of various vehicle systems (i.e., powertrain, electrical system, body condition) and/or the overall condition of the vehicle 120, 130. Such a rating may be on a numeric scale (i.e., 0-100), a letter grade (i.e., A-F), symbols (i.e., −, +, ++), any combination thereof, or any alphanumeric or character description on a scale. The rating may be calculated using an algorithm that analyzes the vehicle inspection data. The algorithm may account for the mechanical data describing the mechanical condition of the vehicle to generate a mechanical rating. The mechanical data may be generally quantitative, and the algorithm may generate scores based on the quantitative data. For example, a sensor may calculate tire tread or suspension durability to provide quantitative data about the current mechanical condition of the vehicle. The algorithm may also include image processing software to analyze aesthetic dents, scratches, and other blemishes on the vehicle. The vehicle inspection data may include photographs that the image processing software analyzes to determine an aesthetic score. Finally, the algorithm may combine the aesthetic and mechanical scores to generate the rating. The algorithm may account for things like mileage and highlighted instances of wear and tear to adjust the rating accordingly. The condition report may also include an assessment of any repair work the vehicle 120, 130 may require along with an estimate of the cost to complete the repair work. For example, the inspector may provide an estimate for the repair work to be completed at the inspector's shop. Alternatively, the data storage system 110 may store repair work market rate data for every type of repair in the database 114, and provide the market rate data to the user 110 when transmitting the condition report. For example, the database 114 may store that replacing a suspension for a certain vehicle in a certain area of the country costs $1,000. The condition report may also include a vehicle warranty based upon a vehicle's 120, 130 alphanumeric scores, inspection data, history or other information. Once the vehicle inspection personnel 140 generate a condition report for a vehicle 120, 130, the condition report can be stored in the data storage system 110 for future access and record keeping.

In one embodiment, the inspection personnel 140 may submit information to the data storage system 110, and the data storage system 110 will assess the entered information to generate an appropriate rating. For example, the inspection personnel 140 may enter data such as mileage, size of a dent, or amount of wear, and the data storage system 110 will generate a rating based upon this entered data. In one embodiment, the inspection personnel 140 enter data regarding the condition, wear, or status for each item identified on a checklist, whereby any inspection personnel 140 completing this inspection may be required to complete a review of each item before the generation of the condition report. This configuration may assist with generating a consistent rating system across disparate inspection personnel.

A compiled condition report may have a validity period ending on an expiration date or after an expiration event. For example, the validity period may last for two weeks. In some embodiments, the validity period may be renewed after the expiration date. A condition report may automatically expire if the vehicle continues to accumulate mileage during the validity period. The data storage system 110 may set a validity period based on miles and time. For example, the validity of the condition report may last one month or 1,000 miles before the condition report expires, whichever occurs first. The data storage system 110 stores the validity period information and compares the validity period to a current time when a user requests the condition report. If the time when the condition report is requested is later than the expiration date, the data storage system 110 may alert the requesting user that the condition report is no longer valid. The data storage system 110 may further notify the vehicle owner 100. The data storage system 110 may not always know the current mileage of the vehicle 120, but the data storage system 110 may make the buyer 150 aware that the condition report may not be valid past a certain mileage. The expiration event that causes the condition report to expire may vary from vehicle to vehicle. For example, one car may have a longer expiration period than another, or a first car may have be able to accumulate more mileage before the condition report expires than a second car. The expiration period may also depend on the current age or mileage of the vehicle 120, 130. For example, a car with 20,000 miles may have a condition report that expires after 10,000 miles or a year, whereas a car with 200,000 miles may have a condition report that expires only after 1,000 miles or a month. The difference in expiration events is a result of the confidence the data storage system 110 has that the vehicle will remain in a similar conditional state if the vehicle acquires more miles or more time elapses. The validity period may be calculated by the data storage system 110, and the data storage system 110 may account for the age of the vehicle, mileage of the vehicle, or condition of the vehicle as reflected by the vehicle inspection data. For example, a 2 year old vehicle with 20,000 miles and generally good inspection data may have a much longer validity period than a vehicle that is 2 years old, has 50,000 miles and generally fair inspection data.

When a buyer 150 wishes to buy a vehicle 120, 130, the buyer 150 can request a condition report for that vehicle 120, 130, which may already have been generated or may need to be generated upon the buyer's 150 request. Referring further to FIG. 1, a user such as a prospective vehicle purchaser 150 transmits a request to the data storage system 110 to receive a condition report regarding one or more vehicles 120, 130. The user 150 may transmit the request from a computer or a mobile device such as a phone or tablet 150a. The user 150, such as a prospective vehicle purchaser, may include a person or a dealership or any party who wishes to view a vehicle condition report. In certain embodiments, a user 150 may access the system database 112 over a network, such as a computer network, local or wide area network, private or public network, cellular or satellite network, telephone network, or a cable network. Users 150, such as prospective vehicle purchasers, may be directed to the data storage system 110 from referring websites including, but not limited to, auction, vehicle retail, insurance, vehicle value assessment, vehicle history, and consumer finance sites. In order to obtain access to the data storage system 110, the user 150 may first be required to transmit personal information to the data storage system 110. The personal information may include details about the user's 150 location, income level or whether or not the user 150 plans to purchase a vehicle in the near or distant future. The data storage system 110 collects and stores the personal information provided by the system user 150.

The data storage system 110 can be configured to transmit collected personal information to one or more lead generation partners 160. Lead generation partners 160 may receive the transmitted personal information on a computer or mobile device such as a telephone, smartphone, tablet computer, personal data assistant, handheld computer, personal computer, laptop computer, or other computing device 160a. Personal information may include a name, address, phone number, e-mail address, age, occupation, VIN of requested vehicle, requested vehicle make, requested vehicle model, requested vehicle color, requested vehicle type, or any other personal, or demographic information about the user 150 and the user's 150 request. In other embodiments, upon receipt of personal information, the data storage system 110 may create a customer number that associates a user 150, such as a vehicle purchaser, with a specific vehicle purchase or query. In certain aspects, lead generation data may be associated with a user customer number so that the data storage system 110 may easily reference the data shared with lead generation partners 160. In certain embodiments, lead generation partners 160 may provide offers to a user 150, such as a vehicle purchaser, based on such lead generation data by referencing the user customer number. In other embodiments, the data storage system 110 may broker an arrangement between a vehicle purchaser 150 and a lead generation partner 160 based upon the information shared by a vehicle purchaser 150. Lead generation partners 160 may also receive the transmitted personal information as a part of a subscription service in which payment is made in return for periodic or open access to relevant user personal information. Lead generation partners 160 may include banks or other lending institutions, operators of vehicle transportation services, insurance providers, dealerships, broker services or any other party that offers services to support vehicle purchasers.

Figure 2:
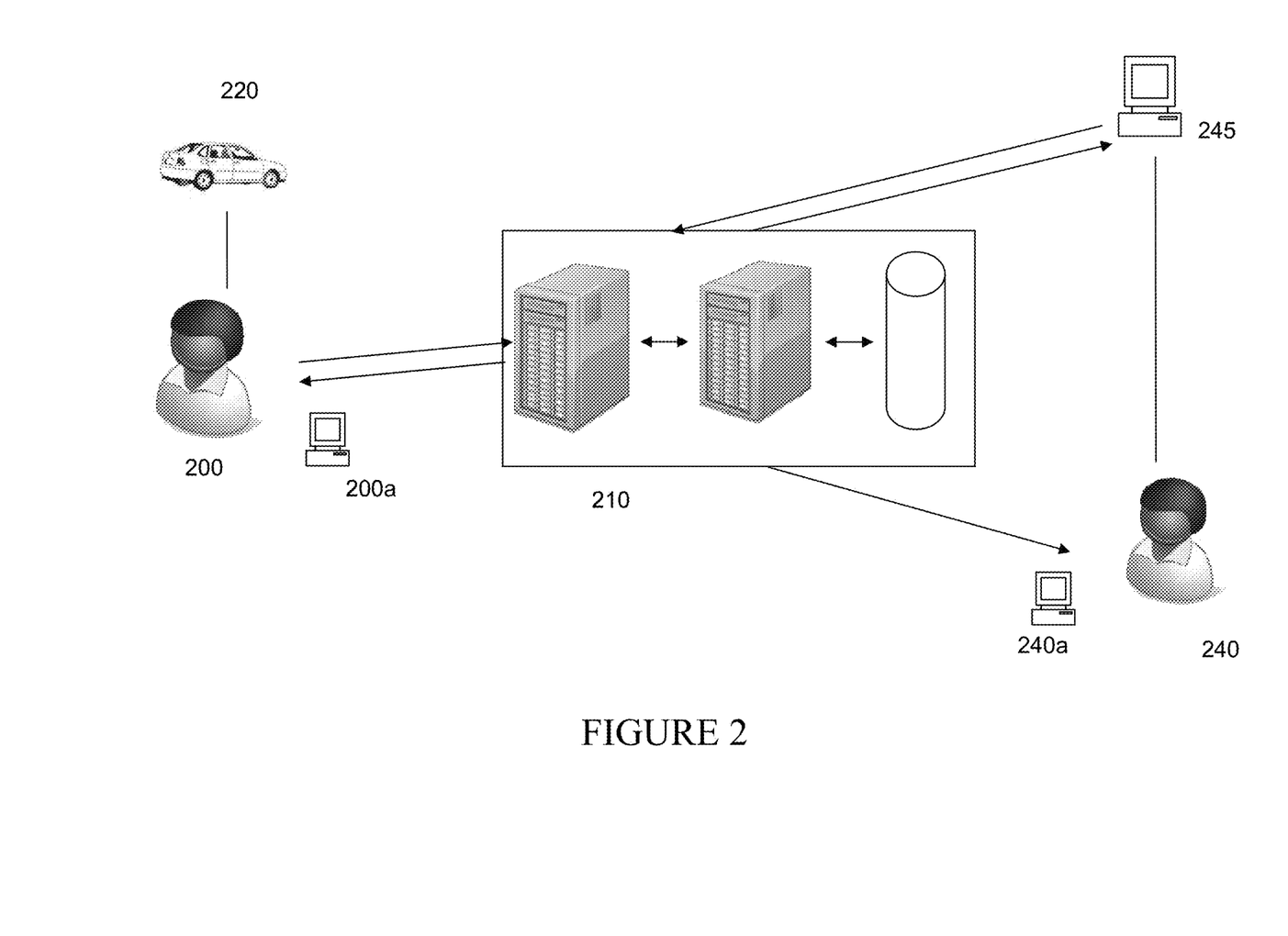
FIG. 2 is a schematic system diagram according to an exemplary embodiment.

The seller or another entity may request a condition report for a vehicle if one does not already exist. Referring to FIG. 2, a user 200, such as vehicle owner or seller, transmits an order for a vehicle condition report to a data storage system 210. The order may include personal information about the user 200, such as name, address, phone number, e-mail address, age, and occupation, and may also include vehicle profile data for the requested vehicle 220, such as VIN of the requested vehicle 220, requested vehicle make, requested vehicle model, requested vehicle color, requested vehicle type, or any other personal or demographic information about the user 200 and the user's requested vehicle 220. The user 200 may transmit the order from a computer or a mobile device 200a. The data storage system 210 stores a listing of dealers, mechanics, and auto servicing establishments, and is configured to search and locate a dealer, mechanic, or auto servicing establishment 240 who can provide an inspection of the user's vehicle 220. Although the auto servicing establishment 240 can be a dealer, mechanic, or other servicing entity, the exemplary embodiments describe a dealer as the auto services establishment 240, though any servicing entity can be used. Additionally, the servicing entity 240 has one or more computers or mobile devices such as a telephone, smartphone, tablet computer, personal data assistant, handheld computer, personal computer, laptop computer, or other computing device 240a communicatively coupled to the data storage system 210 for receiving and transmitting order information. The data storage system 210 transmits instructions to the user 200 directing the user to take a vehicle 220 to the located auto servicing entity 240. The data storage system 210 transmits a notice of the order to the auto servicing establishment 240. The notice includes customer and vehicle profile data such as the make model and age of the vehicle 220 and the name, contact information, and address of the user 200. The notice may also include instructions regarding a request to complete a condition report, provide information to generate a condition report, or any other type of inspection the auto servicing establishment 240 is to perform. The dealer, mechanic or auto servicing establishment 240 receives the notice via a dealer-side website that the auto servicing establishment 240 may access from a computer or mobile device 240a.

When the user or another party (e.g., a seller) 200 delivers the vehicle 220 to the dealer 240 for inspection, the vehicle's 220 VIN (vehicle identification number) can be scanned by the dealer 240 using a mobile handheld device 245 configured to interface with the data storage system 210. The mobile handheld device 245 may be a computing device comprising at least one processor, memory, a network interface for communication with other computing devices, and an input/output device for interfacing with the user, such as a touch screen. The mobile handheld device 245 may also include a camera for taking pictures of the vehicle 220. The mobile handheld device 245 may be configured to recall a specific inspection protocol based on, for example, the vehicle's VIN. Alternatively, the vehicle profile data can be manually entered into the computing device 240a. In another alternative, the order for the inspection can pre-populate a form for the dealer 240 with the vehicle profile data. The dealer 240 may perform a mechanical and cosmetic inspection of the vehicle 220 following prompts provided by the mobile handheld device or other computer 245. The mobile handheld 245 may be configured with an application that verifies that the specific inspection protocol is being followed. The mobile handheld device 245 may be adapted to perform diagnostic functions suitable to determine a vehicle's 220 cosmetic or operational condition and to collect and transmit vehicle inspection data. In some embodiments, the mobile handheld 245 may be able to connect to the vehicle 220 and communicate with the vehicle's 220 engine control unit ("ECU") to receive diagnostic information about the vehicle 220. The mobile handheld 245 may also be configured to provide vehicle repair estimates. In another aspect, the dealer's mobile handheld 245 may provide post-repair vehicle value estimates based upon information retrieved from references such as the National Automobile Dealers Association (N.A.D.A.) and Kelley Blue Book. In one embodiment, when the dealer has completed the vehicle inspection prescribed by the mobile handheld 245, the vehicle inspection data is uploaded from the mobile handheld 245 to the data storage system 210 where it is compiled into a vehicle condition report. The data storage system 210 then transmits a notice to the user 200 that the vehicle condition report is available.

Figure 3:
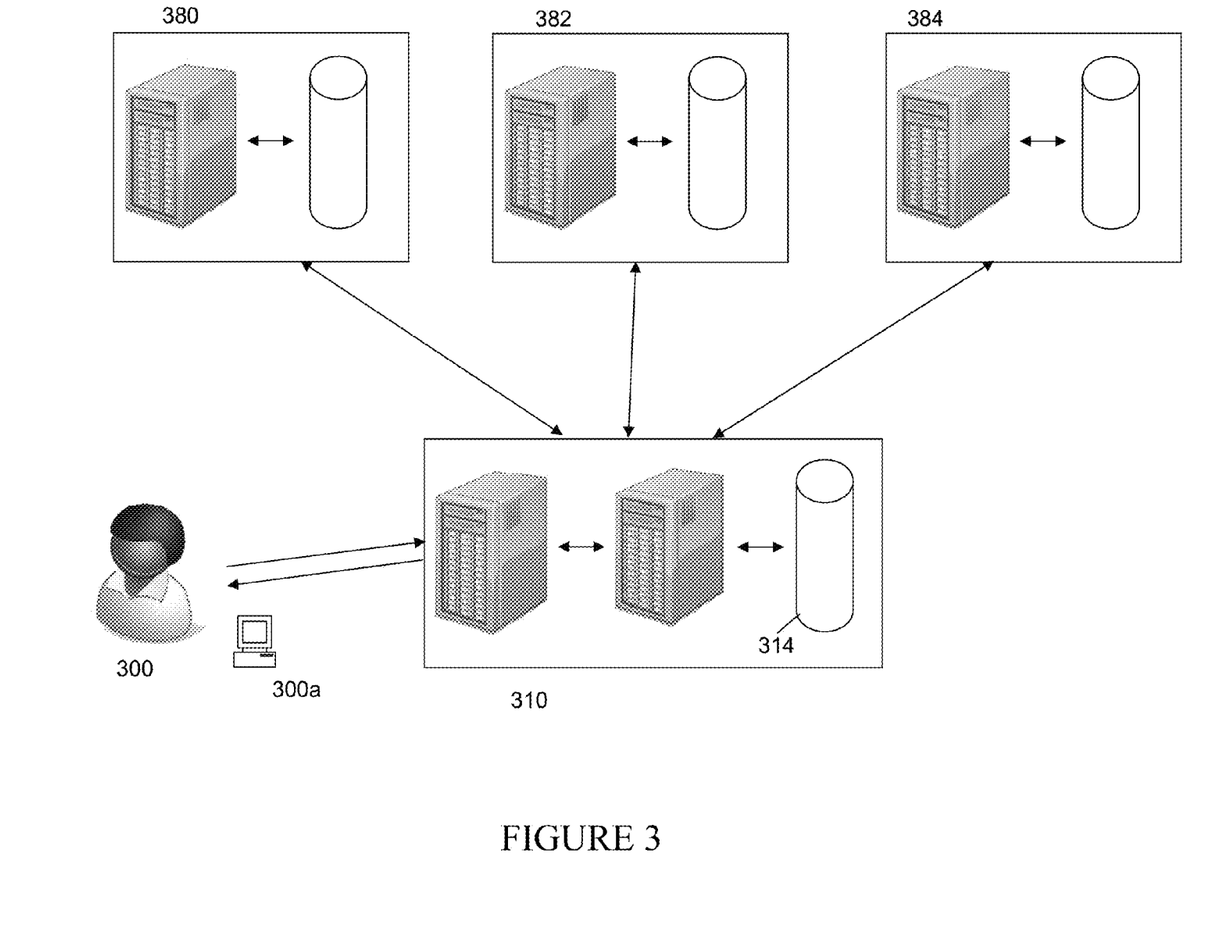
FIG. 3 is a schematic system diagram according to an exemplary embodiment.

In an embodiment shown in FIG. 3, a user 300, such as a prospective buyer, connects to a data storage system 310 using terminal 300a and sends a search query to the data storage system 310. The search query may be transmitted to the data storage system 310 when the user 300 enters text information into a search bar on a website hosted by the data storage system 310. The nature of the search query may vary, but in general, the search query may be a vehicle description, such as the make of the vehicle, the model of the vehicle, the year of the vehicle, the color of the vehicle, the condition of the vehicle, a distance from a certain location, or any other data. Using the received search query, the data storage system 310 connects to a plurality of web-servers 380, 382, 384 and searches for vehicles matching the search query. The plurality of web-servers 380, 382, 384 may host websites where vehicles are listed for purchase. While three web-servers are listed, the data storage system 310 may connect to more or less than three web-servers. Each of the web-servers 380, 382, 384 may host a unique vehicle purchase website. For example, the first web-server 380 may host cars.com, the second web-server may host autotrader.com, and the third web-server may host ebay.com. Using the search query, the data storage system 310 searches for vehicles listed on the websites hosted by the web-servers 380, 382, 384 that match the search query. For example, the user 300 may enter a search query that says "2009 red Nissan Maxima." Upon receiving the search query, the data storage system 310 searches the websites hosted by the web-servers 380, 382, 384 for red 2009 Nissan™ Maximas™. After finding vehicles matching the search query, the data storage system 310 presents the search results to the user 300 in some way, for example by price, by distance away from the user 300, or by a condition report rating.

Using the data received from the plurality of web-servers 380, 382, 384, the data storage system 310 references a database 314 to determine if any uploaded condition reports match vehicle identification data of the vehicles comprising the search query. For example, the data storage system 310 may reference the VIN for each vehicle in the search results and determine if the VIN matches any condition reports in the database 314. Subsequently, the data storage system 310 presents to the user 300 information describing whether any of the vehicles in the search results have a valid condition report. For example, a graphical icon, which may be in the shape of a check mark or other logo, may be fully colored when a valid condition report exists for the vehicle, and the graphical icon may be grayed-out when no condition report could be found that particular vehicle. This graphical icon may indicate to the user 300 whether a condition report for each vehicle in the search results exists.

Using these features, the user 300 may filter out any search results that do not have a condition report because the user 300 is not comfortable buying a vehicle without a condition report. Also, the data storage system 310 may present to the user 300 an option to request that the seller of the vehicle obtain a condition report.

Figure 4:
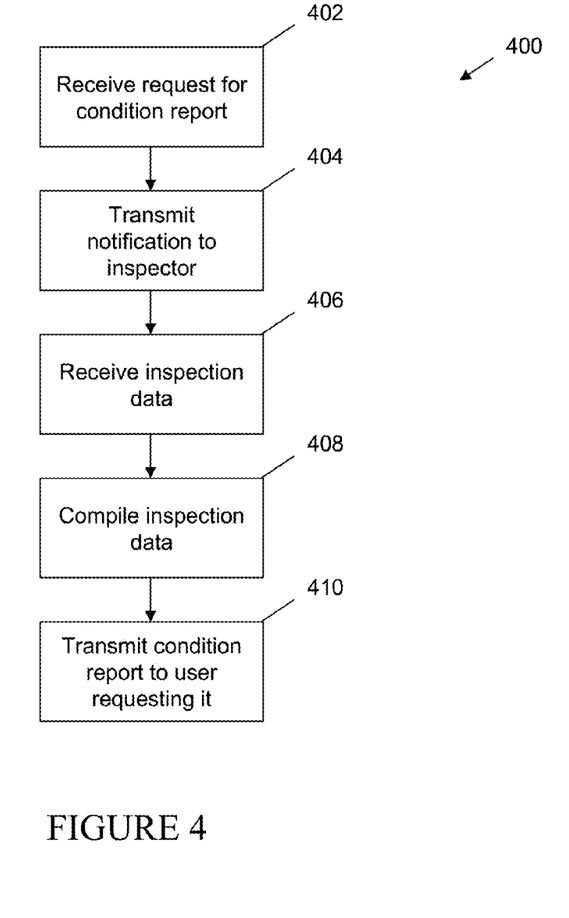
FIG. 4 illustrates a method for generating a condition report according to an exemplary embodiment.

FIG. 4 illustrates a method 400 for generating a condition report according to an exemplary embodiment. The method 400 begins when the data storage system receives a request to generate a vehicle condition report for a vehicle from a first user using a first user terminal over a communication network in step 402. The first user may be a prospective buyer or a vehicle owner. Subsequently, the data storage system transmits a notification to a computer terminal associated with a vehicle inspector notifying the vehicle inspector that a request by the first user has been made to have the vehicle inspected in step 404. The vehicle inspector may be a dealer, a mechanic, or any other certified inspector. The vehicle owner brings the vehicle to the inspector for the vehicle inspection. During the inspection, the inspector gathers data about the aesthetic and mechanical condition of the car. After performing the inspection, the inspector uploads the gathered information to the data storage system, and the data storage system receives vehicle inspection data from the computer terminal associated with the vehicle inspector after the vehicle inspector has inspected the vehicle in step 406. The data storage system may analyze the vehicle inspection data to generate a rating for the vehicle, but this step may be omitted if the inspector has provided his own rating. Upon receiving the vehicle inspection data, the data storage system compiles the vehicle inspection data with vehicle identification data, such as the VIN, to produce a vehicle condition report for the vehicle in step 408. After generating the condition report, the data storage system transmits the condition report to any requesting parties, such as the prospective buyer or the vehicle owner, in step 410.

Figure 5:
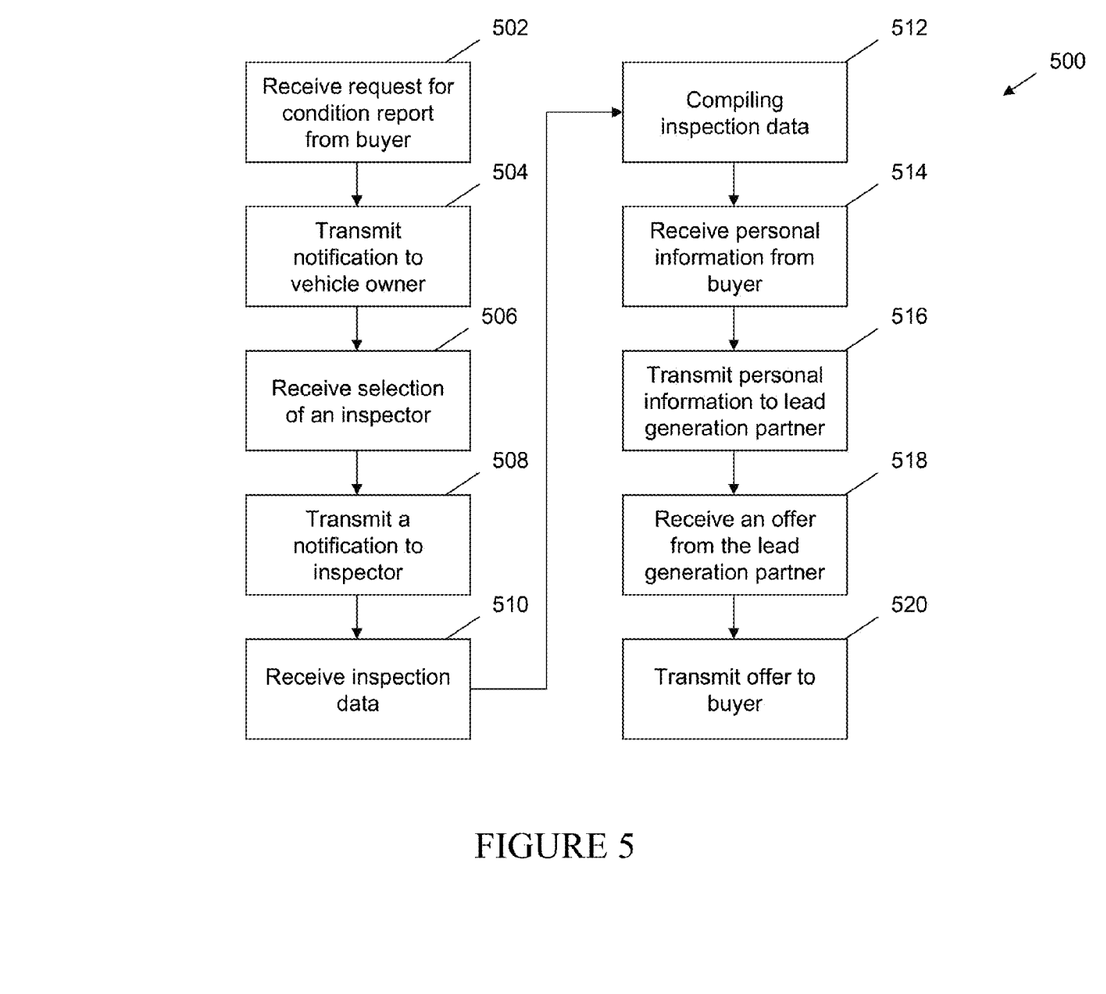
FIG. 5 illustrates a method for generating a lead for a lead generation partner according to an exemplary embodiment.

FIG. 5 illustrates a method 500 for generating a lead for a lead generation partner according to an exemplary embodiment. The method 500 begins when the data storage system receives a request to generate a vehicle condition report for a vehicle from a prospective buyer using a first computer terminal over a communication network in step 502. Subsequently, the data storage system transmits a notification to a computer terminal associated with a vehicle owner notifying the vehicle owner that a request by the prospective buyer has been made to have the vehicle inspected in step 504. Upon receiving the request to obtain a condition report, the vehicle owner may access the data storage system, such as by clicking a link in the notification, to set up an inspection. Upon connecting with the data storage system, the data storage system presents a plurality of certified inspectors located nearby the vehicle owner. The vehicle owner may make a selection of one of the inspectors, and the data storage system receives the selection of the vehicle inspector from the vehicle owner in step 506. In response to receiving the selection, the data storage system transmits a notification to the selected vehicle inspector notifying the vehicle inspector that a request by the vehicle owner has been made to have the vehicle inspected in step 508. The vehicle inspector may be a dealer, a mechanic, or any other certified inspector. The vehicle owner brings the vehicle to the inspector for the vehicle inspection. During the inspection, the inspector gathers data about the aesthetic and mechanical condition of the car. After performing the inspection, the inspector uploads the gathered information to the data storage system, and the data storage system receives vehicle inspection data from the vehicle inspector after the vehicle inspector has inspected the vehicle in step 510. The data storage system may analyze the vehicle inspection data to generate a rating for the vehicle, but this step may be omitted if the inspector has provided his own rating. Upon receiving the vehicle inspection data, the data storage system compiles the vehicle inspection data with vehicle identification data, such as the VIN, to produce a vehicle condition report for the vehicle in step 512. Before the prospective buyer may review the condition report, the prospective buyer may be prompted to upload personal information, such as the prospective buyer's name, email address, location, budget, insurance provider, desired car, or any other personal information, and the data storage system receives the personal information from the prospective buyer in step 514. The vehicle owner may also have to input personal information before selecting an inspector. The data storage system transmits the vehicle condition report and the personal information from the buyer and/or the seller to lead generation partners, such as insurance providers or lending services, in step 516. The lead generation partners analyze the vehicle condition report and personal information to generate offers for the parties. For example, upon learning that the prospective buyer is about to purchase a vehicle, a bank may offer a loan to the buyer, which the buyer may use to purchase the vehicle. The data storage system receives the generated offers from the lead generation partners in step 518, and transmits the offers to the parties in step 520. So, for example, upon reviewing the condition report, the prospective buyer may receive an offer, such as in the form of an advertisement, for a low interest-rate loan or an affordable car insurance plan.

The foregoing has been presented for purposes of illustration and description. It is not intended to be exhaustive or limit the invention to the precise form disclosed. Many modifications and variations are possible in light of the above teaching.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices. The system can be installed on a mobile device.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A method for generating a standardized, consistent, and comprehensive vehicle condition report comprising:
    receiving, by a server, a request to generate a standardized, consistent, and comprehensive vehicle condition report for a vehicle from a first user using a first user terminal over a communication network;
    transmitting, by the server, a notification to a computer terminal associated with a vehicle inspector notifying the vehicle inspector that a request by the first user has been made to have the vehicle inspected;
    receiving, by the server, vehicle inspection data from the computer terminal associated with the vehicle inspector after the vehicle inspector has inspected the vehicle, wherein the vehicle inspection data includes information describing a current mechanical and aesthetic condition of the vehicle;
    compiling, by the server, the vehicle inspection data with vehicle identification data to produce the standardized, consistent, and comprehensive vehicle condition report for the vehicle;
    analyzing, by the server, the information describing the current mechanical condition to generate a mechanical score for the vehicle;
    analyzing, by the server, the information describing the current aesthetic condition to generate an aesthetic score for the vehicle; and
    combining, by the server, the mechanical score and the aesthetic score to generate a standardized, consistent, and comprehensive rating for the vehicle, wherein the compiling further comprises combining the vehicle inspection data, the vehicle identification data, and the rating to produce the standardized, consistent, and comprehensive vehicle condition report for the vehicle.

2. The method of claim 1, further comprising: transmitting, by the server, the standardized, consistent, and comprehensive vehicle condition report to the first user terminal over the communication network.

3. The method of claim 2, wherein the standardized, consistent, and comprehensive vehicle condition report includes an assessment of repair work the vehicle requires and an estimate of the repair work.

4. The method of claim 3, wherein the estimate of the repair work is generated by the inspector.

5. The method of claim 3, further comprising:
    referencing, by the server, a market-rate repair work price for a designated repair in a database; and
    transmitting, by the server, the market-rate repair work price to the first user terminal when transmitting the standardized, consistent, and comprehensive vehicle condition report.

6. The method of claim 1, wherein the vehicle is an automobile, boat, motorcycle, RV, truck, service vehicle, or construction machinery.

7. The method of claim 1, further comprising:
    receiving, by the server, vehicle history data from a third party computer server; and
    compiling, by the server, the vehicle history data into the standardized, consistent, and comprehensive vehicle condition report.

8. The method of claim 1, wherein the standardized, consistent, and comprehensive vehicle condition report includes photographs of the interior and exterior of the vehicle.

9. The method of claim 8, wherein the standardized, consistent, and comprehensive vehicle condition report includes at least one photograph of the vehicle's interior, each wheel of the vehicle, the vehicle's fender, the vehicle's bumper, the vehicle's side, the vehicle's top, the vehicle's back end, the vehicle's dashboard, and the vehicle's odometer.

10. The method of claim 1, wherein the standardized, consistent, and comprehensive vehicle condition report includes current vehicle mechanical condition, condition of the vehicle's body and interior, and the rating for the vehicle.

11. The method of claim 1, further comprising: calculating, by the server, a validity period having an expiration event for the standardized, consistent, and comprehensive vehicle condition report based on the age of the vehicle, mileage of the vehicle, or the vehicle inspection data.

12. The method of claim 9, wherein the expiration event is either an expiration time or an amount of miles accumulated by the vehicle.

13. The method of claim 1, further comprising: transmitting, by the server, location data of nearby inspectors to the first user terminal over the communication network before transmitting a notification to the inspector; and receiving, by the server, a selection for the inspector from the first user terminal.

14. A system for generating a standardized, consistent, and comprehensive vehicle condition report comprising:
a server configured to:
receive a request to generate a standardized, consistent, and comprehensive vehicle condition report for a vehicle from a first user using a first user terminal over a communication network;
transmit a notification to a computer terminal associated with a vehicle inspector notifying the vehicle inspector that the request by the first user has been made to have the vehicle inspected;
receive vehicle inspection data from the computer terminal associated with the vehicle inspector after the vehicle inspector has inspected the vehicle, wherein the vehicle inspection data includes information describing a current mechanical and aesthetic condition of the vehicle;
compile the vehicle inspection data with vehicle identification data to produce the standardized, consistent, and comprehensive vehicle condition report for the vehicle; and
transmit the standardized, consistent, and comprehensive vehicle condition report to a user terminal requesting the standardized, consistent, and comprehensive vehicle condition report;
analyze the information describing the current mechanical condition to generate a mechanical score for the vehicle;
analyze the information describing the current aesthetic condition to generate an aesthetic score for the vehicle; and
combine the mechanical score and the aesthetic score to generate a standardized, consistent, and comprehensive rating for the vehicle, wherein the compiling further comprises combining the vehicle inspection data, the vehicle identification data, and the rating to produce the standardized, consistent, and comprehensive vehicle condition report for the vehicle; and
a database configured to receive the standardized, consistent, and comprehensive vehicle condition report from the server, and to store the standardized, consistent, and comprehensive vehicle condition report.

15. A method for generating a standardized, consistent, and comprehensive vehicle condition report comprising:
receiving, by a server, a request to generate a standardized, consistent, and comprehensive vehicle condition report for a vehicle from a first user using a first user terminal over a communication network;
transmitting, by the server, a notification to a computer terminal associated with a vehicle inspector notifying the vehicle inspector that a request by the first user has been made to have the vehicle inspected;
receiving, by the server, vehicle inspection data from the computer terminal associated with the vehicle inspector after the vehicle inspector has inspected the vehicle, wherein the vehicle inspection data includes quantitative mechanical data and aesthetic condition data describing a current mechanical and aesthetic condition of the vehicle;
analyzing, by the server, the quantitative mechanical data included in the vehicle inspection data to generate a mechanical score for the vehicle;
analyzing, by the server, the aesthetic condition data included in the vehicle inspection data to generate an aesthetic score for the vehicle;
combining, by the server, the mechanical score and the aesthetic score to generate a standardized, consistent, and comprehensive rating for the vehicle; and
compiling, by the server, the vehicle inspection data with vehicle identification data and the rating to produce the standardized, consistent, and comprehensive vehicle condition report for the vehicle.

16. The method of claim 15, further comprising: transmitting, by the server, the standardized, consistent, and comprehensive vehicle condition report to the first user terminal over the communication network.

17. The method of claim 15, further comprising: analyzing, by the server, vehicle history data and adjusting the rating as a result of the vehicle history data.

18. The method of claim 15, wherein the aesthetic condition data includes photographs of the interior and exterior of the vehicle.

19. The method of claim 18, wherein generating the aesthetic score comprises analyzing, by the server, the photographs using image processing to search for dents, scratches, or blemishes.

20. A system for generating a standardized, consistent, and comprehensive vehicle condition report comprising:
a server configured to:
receive a request to generate a standardized, consistent, and comprehensive vehicle condition report for a vehicle from a first user using a first user terminal over a standardized, consistent, and comprehensive communication network;
transmit a notification to a computer terminal associated with a vehicle inspector notifying the vehicle inspector that a request by the first user has been made to have the vehicle inspected;
receive vehicle inspection data from the computer terminal associated with the vehicle inspector after the vehicle inspector has inspected the vehicle, wherein the vehicle inspection data includes quantitative mechanical data and aesthetic condition data describing a current mechanical and aesthetic condition of the vehicle;
analyze the quantitative mechanical data included in the vehicle inspection data to generate a mechanical score for the vehicle;
analyze the aesthetic condition data included in the vehicle inspection data to generate an aesthetic score for the vehicle;
combine the mechanical score and the aesthetic score to generate a rating for the vehicle; and
compile the vehicle inspection data with vehicle identification data and the rating to produce the standardized, consistent, and comprehensive vehicle condition report for the vehicle;
analyze the information describing the current mechanical data to generate a mechanical score for the vehicle;
analyze the information describing the current aesthetic data to generate an aesthetic score for the vehicle; and
combine the mechanical score and the aesthetic score to generate a standardized, consistent, and comprehensive rating for the vehicle, wherein the compiling further comprises combining the vehicle inspection data, the vehicle identification data, and the rating to produce a standardized, consistent, and comprehensive vehicle condition report for the vehicle; and
a database configured to receive the standardized, consistent, and comprehensive vehicle condition report from the server, and to store the standardized, consistent, and comprehensive vehicle condition report.

21. A handheld device comprising:
a camera configured to record images;
a memory unit configured to store information inputted by a user, information received from the camera, information generated by the handheld device, and a software application, wherein the software application is configured to:
  receive a vehicle identification number ("VIN") of a vehicle;
  load an inspection protocol based on the vehicle's VIN; and
  generate instructions that guide the user through the inspection protocol, wherein the instructions include displaying pre-populated vehicle profile data based on the VIN, calling the camera so that the user uses the camera to record an image of designated areas of the vehicle, and generating a form where the user can input data about the vehicle;
  analyze the information describing the current mechanical data to generate a mechanical score for the vehicle;
  analyze the information describing the current aesthetic data to generate an aesthetic score for the vehicle; and
  combine the mechanical score and the aesthetic score to generate a standardized, consistent, and comprehensive rating for the vehicle, wherein the compiling further comprises combining the vehicle inspection data, the vehicle identification data, and the rating to produce a standardized, consistent, and comprehensive vehicle condition report for the vehicle;
a network interface configured to connect the handheld device to a network and communicate with other computing devices;
an input/output device configured to receive information input by the user and display information to the user; and
a processor configured to execute the software application, process image information from the camera, and process all information inputted during the inspection protocol to generate vehicle inspection data to be sent through the network interface to a server.

22. The handheld device of claim 21, wherein the handheld receives the VIN by scanning the VIN on the vehicle using the camera.

23. The handheld device of claim 21, wherein the network interface is further configured to communicate with the engine control unit ("ECU") of the vehicle to receive engine diagnostic information from the ECU.

24. A method for generating a standardized, consistent, and comprehensive vehicle condition report comprising:
  receiving, by a server, a request to generate the standardized, consistent, and comprehensive vehicle condition report for a vehicle from a prospective buyer using a first computer terminal over a communication network;
  transmitting, by the server, a notification to a vehicle owner using a second computer terminal notifying the vehicle owner that the prospective buyer requested the standardized, consistent, and comprehensive vehicle condition report for the vehicle;
  receiving, by the server, a selection of a vehicle inspector from the vehicle owner using the second computer terminal;
  transmitting, by the server, a notification to the vehicle inspector using a third computer terminal notifying the vehicle inspector that a request has been made to have the vehicle inspected;
  receiving, by the server, vehicle inspection data from the third computer terminal after the vehicle inspector has inspected the vehicle, wherein the vehicle inspection data includes information describing a current mechanical and aesthetic condition of the vehicle;
  compiling, by the server, the vehicle inspection data with vehicle identification data to produce the standardized, consistent, and comprehensive vehicle condition report for the vehicle;
  analyzing, by the server, the information describing the current mechanical data to generate a mechanical score for the vehicle;
  analyzing, by the server, the information describing the current aesthetic condition data to generate an aesthetic score for the vehicle; and
  combining, by the server, the mechanical score and the aesthetic score to generate a standardized, consistent, and comprehensive rating for the vehicle, wherein the compiling further comprises combining the vehicle inspection data, the vehicle identification data, and the rating to produce a standardized, consistent, and comprehensive vehicle condition report for the vehicle.

25. The method of claim 24, further comprising:
  receiving, by the server, personal information from the first user terminal;
  transmitting, by the server, the personal information and the standardized, consistent, and comprehensive vehicle condition report to a lead generation partner using a fourth computer terminal;
  receiving, by the server, an offer based upon the personal information and the standardized, consistent, and comprehensive vehicle condition report from the lead generation partner using the fourth computer terminal; and
  transmitting, by the server, the offer to the prospective buyer using the first user terminal.

26. The method of claim 25, wherein the lead generation partner is selected from the group consisting of a bank, an insurance provider, a dealership, a broker, an operator of vehicle transportation services, and a lending institution.

27. The method of claim 25, wherein the offer is an insurance plan attached to the standardized, consistent, and comprehensive vehicle condition report for the vehicle.

28. The method of claim 25, wherein the offer is a loan from a bank for purchasing the vehicle.

29. The method of claim 25, wherein the offer is presented to the prospective buyer with the standardized, consistent, and comprehensive vehicle condition report.

* * * * *